(12) United States Patent
Nishita et al.

(10) Patent No.: US 9,358,896 B2
(45) Date of Patent: Jun. 7, 2016

(54) ENERGY MANAGEMENT SYSTEM

(71) Applicants: Yoshito Nishita, Tokyo (JP); Masahiko Tanimoto, Tokyo (JP); Nanaho Osawa, Tokyo (JP)

(72) Inventors: Yoshito Nishita, Tokyo (JP); Masahiko Tanimoto, Tokyo (JP); Nanaho Osawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 167 days.

(21) Appl. No.: 14/362,755

(22) PCT Filed: Dec. 6, 2012

(86) PCT No.: PCT/JP2012/081621
§ 371 (c)(1),
(2) Date: Jun. 4, 2014

(87) PCT Pub. No.: WO2013/099549
PCT Pub. Date: Jul. 4, 2013

(65) Prior Publication Data
US 2014/0361745 A1 Dec. 11, 2014

(30) Foreign Application Priority Data

Dec. 27, 2011 (JP) ................................. 2011-284695

(51) Int. Cl.
*H02J 7/00* (2006.01)
*B60L 11/18* (2006.01)
(Continued)

(52) U.S. Cl.
CPC ........... *B60L 11/1844* (2013.01); *B60L 11/184* (2013.01); *B60L 11/1824* (2013.01);
(Continued)

(58) Field of Classification Search
CPC ............ B60L 11/1809; B60L 11/1824; B60L 11/1846; B60L 11/1844
USPC ......................................... 320/107–109, 115
See application file for complete search history.

(56) References Cited

U.S. PATENT DOCUMENTS 7,492,877 B2    2/2009  Yamagishi et al.
8,330,415 B2   12/2012  Sato et al.
(Continued)

FOREIGN PATENT DOCUMENTS

CN      101849339 A     9/2010
JP      2000 209707     7/2000
(Continued)

OTHER PUBLICATIONS

International Search Report Issued Mar. 12, 2013 in PCT/JP12/081621 Filed Dec. 6, 2012.
(Continued)

*Primary Examiner* — Paul Dinh
(74) *Attorney, Agent, or Firm* — Oblon, McClelland, Maier & Neustadt, L.L.P.

(57) ABSTRACT

An energy management system that achieves minimization of electric power costs and leveling of an electric power demand while securing necessary battery residual quantity. The energy management system includes a charging stand that supplies electric power to an electric vehicle (EV) as an electric power supply part, a reservation information acquisition unit that acquires reservation information on electric power reception of the EV in the charging stand before the EV arrives at the charging stand, a charging plan preparation unit that predicts an electric power demand in the charging stand and prepares a charging plan for the EV based on the reservation information, and a charging controller that controls electric power supply for the EV in the charging stand based on the charging plan.

9 Claims, 18 Drawing Sheets

(51) Int. Cl.
*H02J 7/04* (2006.01)
*G06Q 50/06* (2012.01)

(52) U.S. Cl.
CPC ......... *B60L11/1842* (2013.01); *B60L 11/1846* (2013.01); *B60L 11/1848* (2013.01); *G06Q 50/06* (2013.01); *H02J 7/041* (2013.01); *B60L 2240/80* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | | |
|---|---|---|---|
| 2010/0076825 | A1 | 3/2010 | Sato et al. |
| 2012/0112696 | A1 | 5/2012 | Ikeda et al. |
| 2012/0150463 | A1 | 6/2012 | Ozawa et al. |
| 2013/0181672 | A1* | 7/2013 | Egoshi .................. G06Q 10/02 320/109 |
| 2014/0125279 | A1* | 5/2014 | Juhasz .................. H02J 7/0013 320/109 |

FOREIGN PATENT DOCUMENTS

| | | |
|---|---|---|
| JP | 2001 8380 | 1/2001 |
| JP | 2003 269000 | 9/2003 |
| JP | 2004-118783 A | 4/2004 |
| JP | 2007 28036 | 2/2007 |
| JP | 2008 67418 | 3/2008 |
| JP | 2010 81722 | 4/2010 |
| JP | 2010 110044 | 5/2010 |
| JP | 2010 110173 | 5/2010 |
| JP | 2011 83166 | 4/2011 |
| JP | 2011 188596 | 9/2011 |
| JP | 2011 239662 | 11/2011 |
| WO | 2005 057982 | 6/2005 |
| WO | 2011 007573 | 1/2011 |
| WO | 2011 024366 | 3/2011 |

OTHER PUBLICATIONS

International Preliminary Report on patentability and Written Opinion issued on Jul. 10, 2014 in PCT/JP2012/081621filed on Dec. 6, 2012 (with English Translation).

Office Action mailed Dec. 21, 2015 in Chinese Patent Application No. 201280064587.1 (with English Translation).

* cited by examiner

F I G . 5
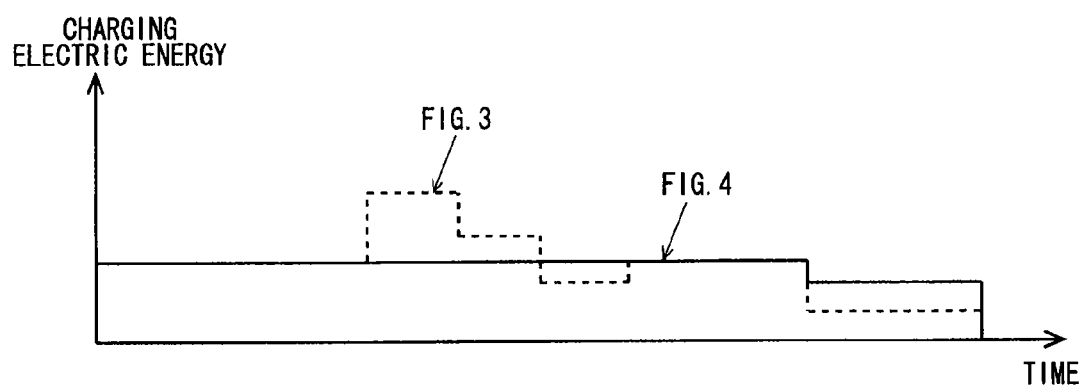

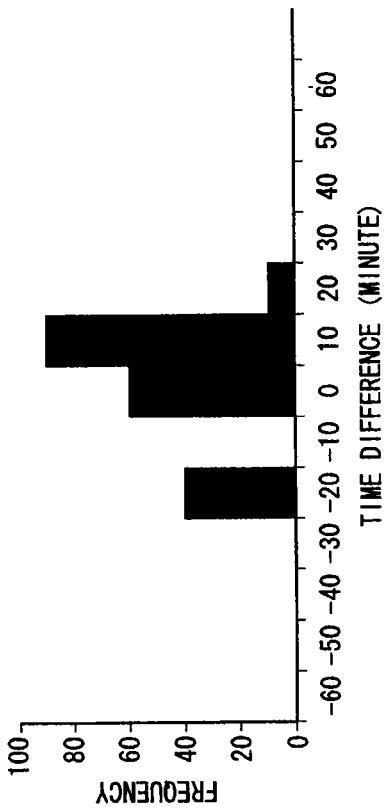
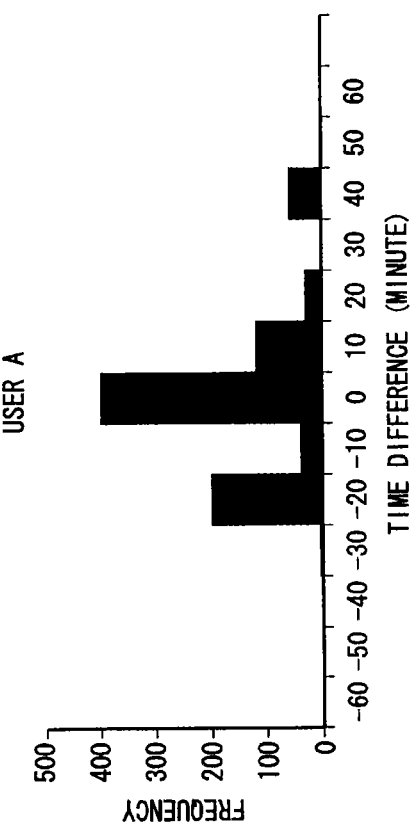
FIG. 8

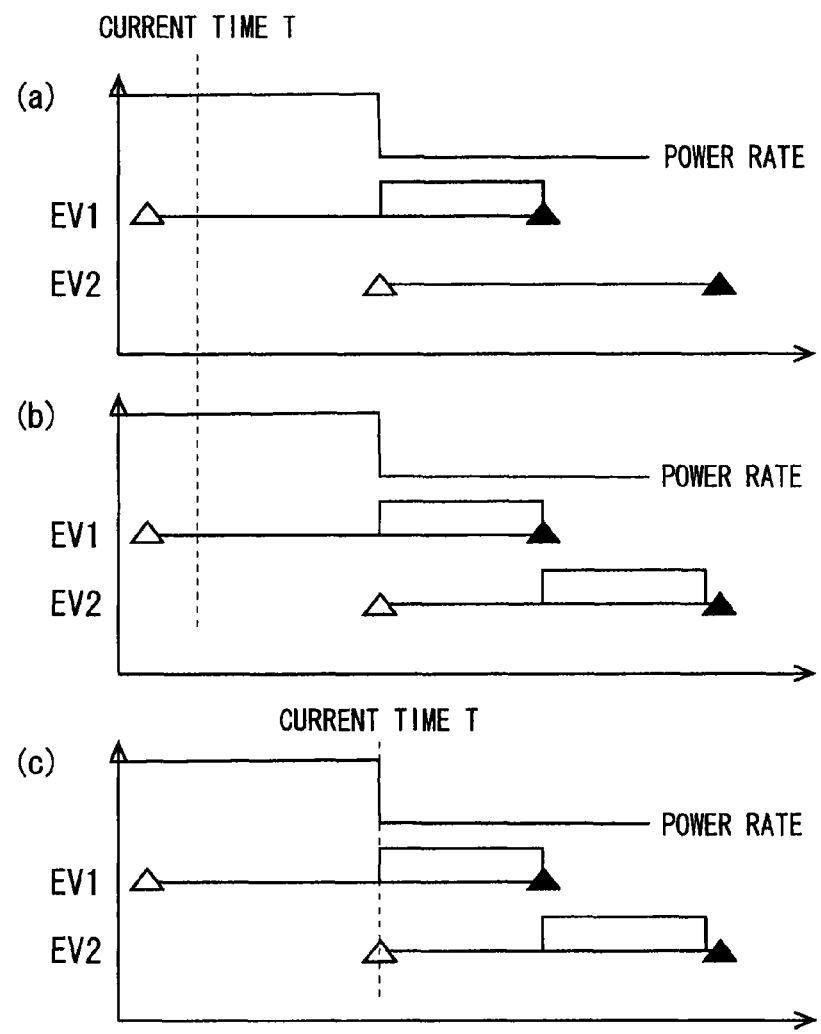
F I G . 1 4

ENERGY MANAGEMENT SYSTEM

TECHNICAL FIELD

The present invention relates to an energy management system for minimizing electric power costs and leveling an electric power demand of a facility that has a charging stand associated with charging of an electric vehicle (hereinafter referred to as EV).

BACKGROUND ART

Conventionally, for example, as described in Patent Document 1, a motor vehicle charging apparatus has been proposed for suppressing rapid increase in an electric power demand associated with charging of a plurality of EVs by calculating charge start time and charge end time from charging time and desired end time inputted when an EV arrives at a charging stand.

In addition, for example, as described in Patent Document 2, an electric power supply control device has been proposed for controlling charging of an EV so as not to exceed an upper limit of a suppliable electric power by setting priority for each vehicle type or purpose of use and adjusting a power supply amount to the vehicle connected to the charging stand.

PRIOR ART DOCUMENT

Patent Document

Patent Document 1: Japanese Patent Application Laid-Open No. 2010-110044
Patent Document 2: Japanese Patent Application Laid-Open No. 2010-110173

SUMMARY OF INVENTION

Problems to be Solved by the Invention

The motor vehicle charging apparatus described in Patent Document 1 involves a problem that, since information on new charging reservation cannot be acquired until an EV is connected to a charging stand, estimated connection of the EV to the charging stand cannot be grasped, and that a charging plan in consideration of charging of the EV to be connected cannot be prepared.

The electric power supply control apparatus described in Patent Document 2 involves a problem that a vehicle with lower priority is not charged when there are many vehicles with higher priority, and that a battery residual quantity necessary when used cannot be secured.

The present invention has been made to solve the above problems, and an object is to achieve leveling of the electric power demand while securing the necessary battery residual quantity.

Means for Solving the Problems

An energy management system according to the present invention includes an electric power supply part that supplies electric power to an electric vehicle, a reservation information acquisition unit that acquires reservation information before the electric vehicle arrives at the electric power supply part, the reservation information including at least estimated connection time that the electric vehicle is connected to the electric power supply part and estimated parallel-off time that the electric vehicle is paralleled off from the electric power supply part, a connection-and-parallel-off control unit that controls connection-and-parallel-off information indicating a connection state and parallel-off state of the electric vehicle to the electric power supply part, an electric vehicle result control unit that controls the reservation information and the connection-and-parallel-off information, an electric vehicle tendency evaluation unit that prepares tendency information of the electric vehicle using a difference between the estimated connection time and actual connection time indicated by the connection-and-parallel-off information, and a difference between the estimated parallel-off time and actual parallel-off time indicated by the connection-and-parallel-off information, a charging plan preparation unit that predicts an electric power demand in the electric power supply part and prepares a charging plan for the electric vehicle based on the tendency information, and a charging controller that controls electric power supply for the electric vehicle in the electric power supply part based on the charging plan.

Effects of the Invention

According to an energy management system of the present invention, leveling of an electric power demand can be achieved while securing a necessary battery residual quantity by the provision of an electric power supply part that supplies electric power to an electric vehicle, a reservation information acquisition unit that acquires reservation information on electric power reception in the electric power supply part for the electric vehicle before the electric vehicle arrives at the electric power supply part, a charging plan preparation unit that predicts an electric power demand in the electric power supply part and prepares a charging plan for the electric vehicle based on the reservation information, and a charging controller that controls electric power supply for the electric vehicle in the electric power supply part based on the charging plan.

The objects, features, aspects, and advantages of the present invention become more apparent by the following detailed description and accompanying drawings.

BRIEF DESCRIPTION OF DRAWINGS

FIG. 5 is a diagram illustrating a graph of charging electric energy for each time required in the charging plan of FIG. 3 and FIG. 4 according to the first embodiment of the present invention.

FIG. 8 is a diagram illustrating a histogram representing an EV tendency prepared by an EV tendency evaluation unit according to the second embodiment of the present invention.

FIG. 14 is a diagram illustrating a charging plan with the reservation information including estimated parallel-off time in the first embodiment of the present invention.

DESCRIPTION OF EMBODIMENTS

First Embodiment

Configuration

Figure 1:
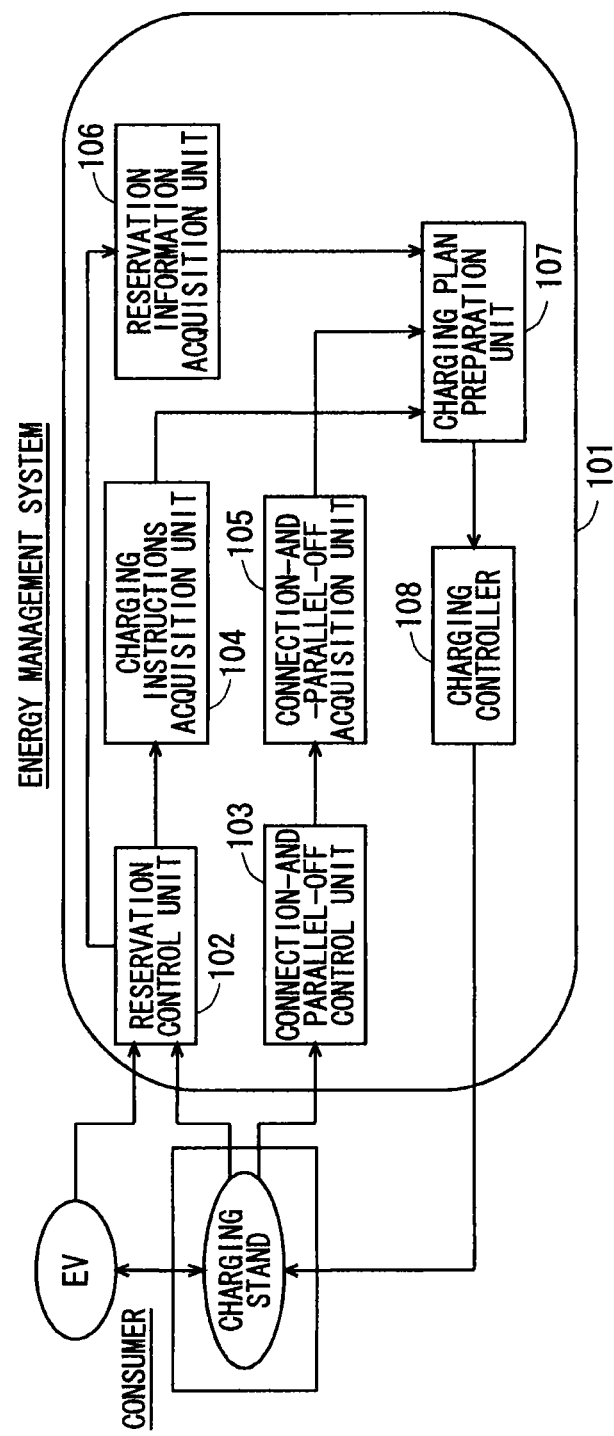
FIG. 1 is a configuration diagram of an energy management system according to a first embodiment of the present invention.

FIG. 1 is a configuration diagram of an energy management system according to a first embodiment of the present invention. The energy management system in the present invention prepares a charging plan, and controls electric power supply to an EV of a consumer who has a charging stand as an electric power supply part. The charging plan schedules time and a place to charge, a charging method, and the like.

Herein, a charging station for EVs and the like are assumed as the consumer who has the charging stand, but the consumer may be a condominium, office building, factory, hotel, station, hospital, or the like that has a plurality of charging stands.

First, an energy management system 101 will be described.

The energy management system 101 includes a reservation control unit 102 that controls reservation information from the EV and charging instructions to the EV, a charging instructions acquisition unit 104 that acquires information regarding the charging instructions (charging instructions information) from the reservation control unit 102, a reservation information acquisition unit 106 that acquires the reservation information from the reservation control unit 102 before the EV arrives at the charging stand, a connection-and-parallel-off control unit 103 that controls a connection state of the EV to the charging stand and a disconnection state from the charging stand (parallel-off state in which power generation equipment or the like is separated from an electric power system), a connection-and-parallel-off acquisition unit 105 that acquires information (connection-and-parallel-off information) regarding the connection-and-parallel-off state of the EV from the connection-and-parallel-off control unit 103, a charging plan preparation unit 107 that prepares a charging plan in accordance with a purpose for each consumer based on the connection-and-parallel-off information, the charging instructions information, and the reservation information, and a charging controller 108 that controls electric energy supplied to the EV via the charging stand based on the charging plan.

However, the reservation control unit 102 and the connection-and-parallel-off control unit 103 may be external functions of the energy management system 101 of the present invention.

The reservation control unit 102 controls the reservation information inputted by a user of the EV before arriving at the charging stand, such as, for example, estimated connection time, estimated parallel-off time, arrival-time battery residual quantity, and necessary charging quantity (minimum charging quantity to be secured), and the charging instructions information set by the user of the EV for the charging stand at the time of arriving at the charging stand, such as charging start time, desired charging end time, and the necessary charging quantity.

Herein, the estimated connection time and the arrival-time battery residual quantity may be directly inputted by the user or may be those estimated by a car-navigation system mounted in the EV.

In addition, the reservation control unit 102 associates the reservation information and the charging instructions information with the reserved EV, and inputs the reservation information into the reservation information acquisition unit 106 and the charging instructions information into the charging instructions acquisition unit 104, respectively.

Herein, the association of the reserved EV may be established with those with estimated connection time and the like of the reservation information and charging start time and the like of the charging instructions information being the closest in time, and may be selected by the user from among the reservation information. Then, the reservation information acquisition unit 106 receives the reservation information controlled in the reservation control unit 102. In addition, the charging instructions acquisition unit 104 receives the charging instructions information controlled in the reservation control unit 102. However, timing to receive the information may be a regular interval and may be time when the reservation or the charging instruction is set.

The connection-and-parallel-off control unit 103 controls information regarding the EV (EV information) and information about the connection-and-parallel-off time and the like of the EV to the charging stand when the EV is connected to or paralleled off from the charging stand. Herein, the EV information is information for identifying the EV, such as EV identification ID and user ID.

Then, the connection-and-parallel-off acquisition unit 105 receives the connection-and-parallel-off information controlled in the connection-and-parallel-off control unit 103, that is, the EV information and information about the connection-and-parallel-off time and the like. However, timing to receive the information may be a regular interval and may be time when the reservation or the charging instruction is set.

The charging controller 108 controls charging electric energy of the EV connected based on the charging plan prepared by the charging plan preparation unit 107.

<Operation>

Figure 2:
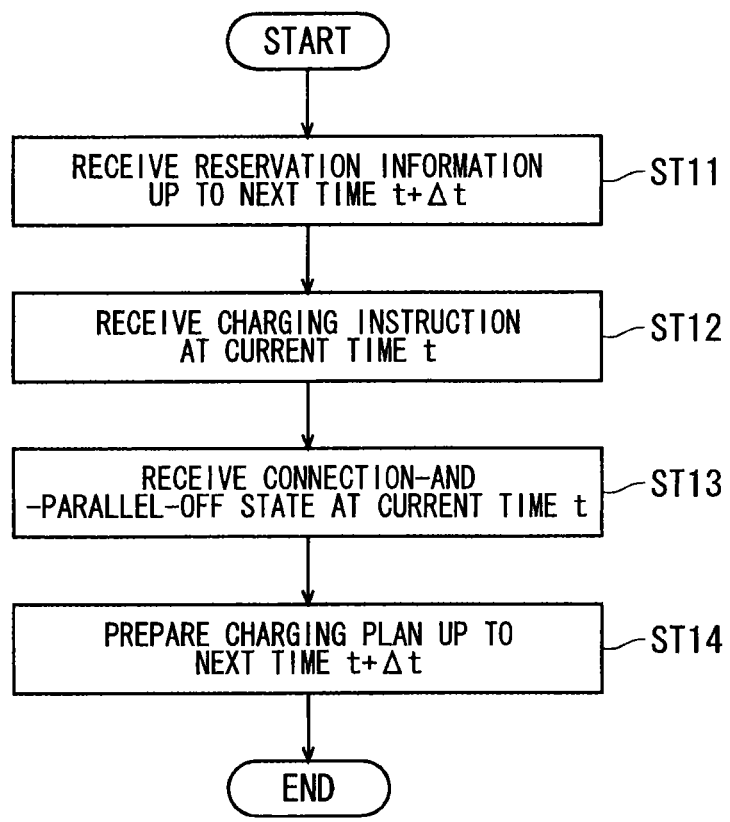
FIG. 2 is a flow chart illustrating a preparation process of a charging plan by a charging plan preparation unit of the energy management system according to the first embodiment of the present invention.

FIG. 2 is a flow chart illustrating a preparation process of the charging plan by the charging plan preparation unit 107. The charging plan preparation unit 107 receives the charging instructions information from the charging instructions acquisition unit 104, receives the reservation information from the reservation information acquisition unit 106, and receives the information regarding the connection-and-parallel-off state obtained from the connection-and-parallel-off acquisition unit 105, respectively, and prepares the charging plan for the EV according to the purpose of the consumer (such as minimization of electric power costs, leveling of an electric power demand, minimization of a charging loss, and an elimination request of power consumption from outside organizations including an electric power company and a municipality).

First, the reservation information from time t to next time t+Δt, the charging instructions information at the time t, and the connection-and-parallel-off information at the time t each are received (step ST11, step ST12, step ST13). Sequence of receiving each piece of information is not limited to the sequence illustrated in the flow chart of FIG. 2.

Next, time from the time t to the next time t+Δt is divided into a period Δs that is equal to or smaller than the period Δt, and the charging electric energy of the EV in the period Δs is calculated to prepare the charging plan (step ST14).

For example, when the charging plan to minimize the electric power costs of the charging stand is prepared, with the charging electric energy of EV (k) from time t+Δs×(i−1) to time t+Δs×i as P (k, i), power consumption P (i) of the charging stand associated with charging of the EV from the time t+Δs×(i−1) to the time t+Δs×i is calculated by Equation (1). Herein, P (k, i) may be a negative value (electric discharge).

[Equation 1]

$$P(i) = \sum_{k=1}^{n} P(k, i) \quad (1)$$

Herein, n in Equation (1) is the number of EVs.

Then, the charging plan to minimize the electric power costs is prepared by solving an optimization problem with a power rate from the time t+Δs×(i−1) to the time t+Δs×i as m (i), an objective function as Equation (2), and a restrictive condition as Equation (3).

[Equation 2]

$$\min \sum_{i=t}^{t+\Delta t} (m(i) \times P(i)) \quad (2)$$

[Equation 3]

$$C_k \leq C_{k0} + \sum_{i=t}^{t+\Delta t} P(k, i) \leq C_{max} \quad (3)$$

$$P_{min} \leq P(i) \leq P_{max}$$
$$S_{min} \leq P(k, i) \leq S_{max}$$
$$C_{ki} = P_{k(i-i)} + P(k, i)$$
$$C_{min} \leq C_{ki} \leq C_{max}$$

Herein, $C_k$ in Equation (3) is the necessary charging quantity of EV (k), $C_{k0}$ is the battery residual quantity at the time of connection of EV (k), and $C_{max}$ is a maximum charging quantity of EV (k). Furthermore, $P_{min}$ is minimum power consumption, $P_{max}$ is maximum power consumption, $S_{min}$ is a maximum electric discharging speed of the EV, $S_{max}$ is a maximum charging speed of the EV, $C_{ki}$ is the battery residual quantity of the EV at the time t+Δs×i, $C_{k(i-1)}$ is the battery residual quantity of the EV at the time t+Δs×(i−1), $C_{min}$ is a minimum value of the electric power accumulated in the battery of the EV, and $C_{max}$ is a maximum value of the electric power accumulated in the battery of the EV. Herein, $S_{min}$ may be a negative value (maximum electric discharging speed).

In addition, the charging plan to level the electric power demand is prepared by, for example, solving the optimization problem with the objective function as Equation (4).

[Equation 4]

$$\min \sum_{i=t}^{t+\Delta t} (P(k, i) - \overline{P(k, i)})^2 \quad (4)$$

$$\overline{P(k, i)} = \frac{\sum_{i=t}^{t+\Delta t} (P(k, i))}{\Delta t}$$

Figure 3:
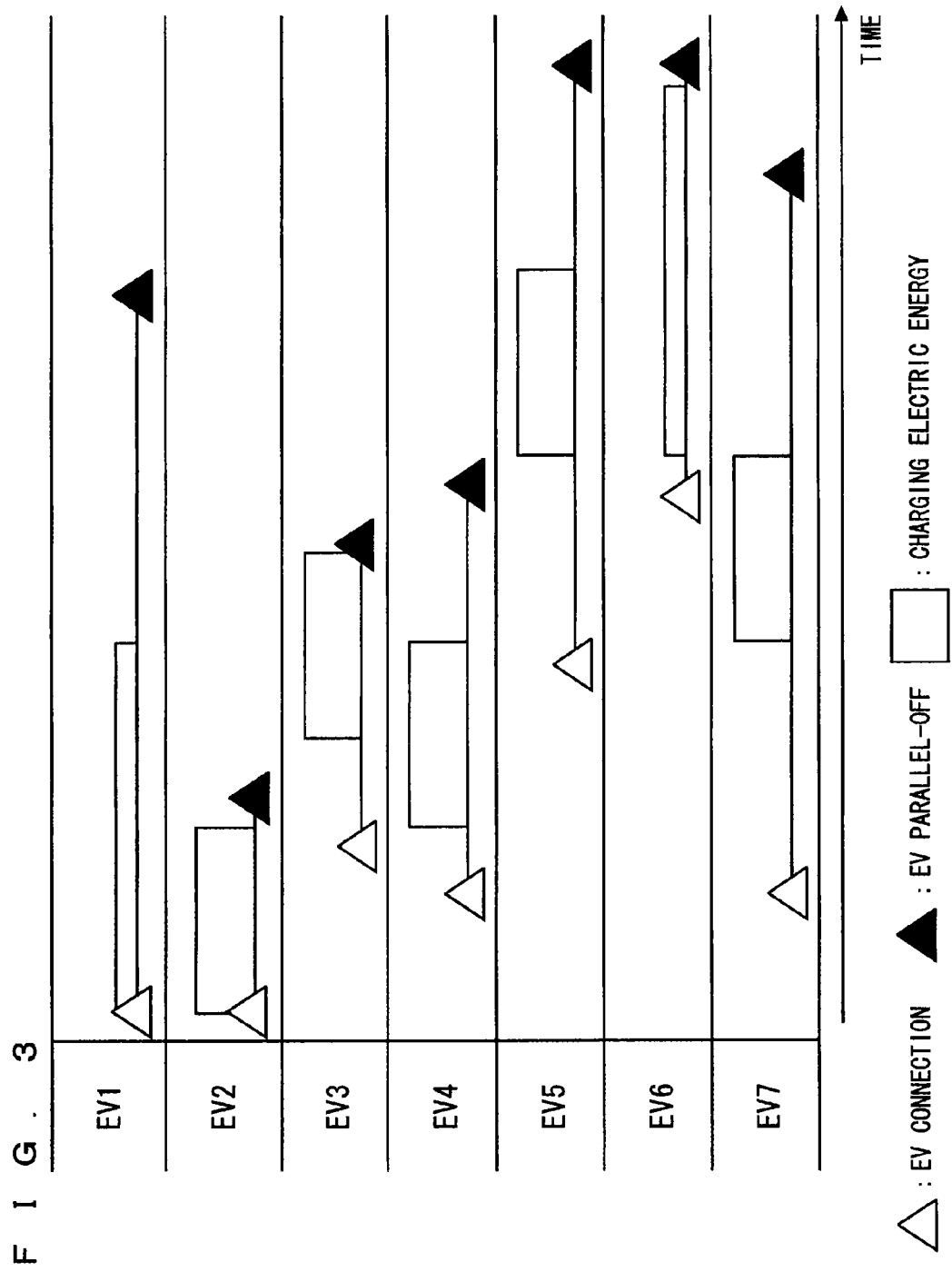
FIG. 3 is a diagram illustrating the charging plan prepared by using charging instructions information and a connection-and-parallel-off state according to the first embodiment of the present invention.
Figure 4:
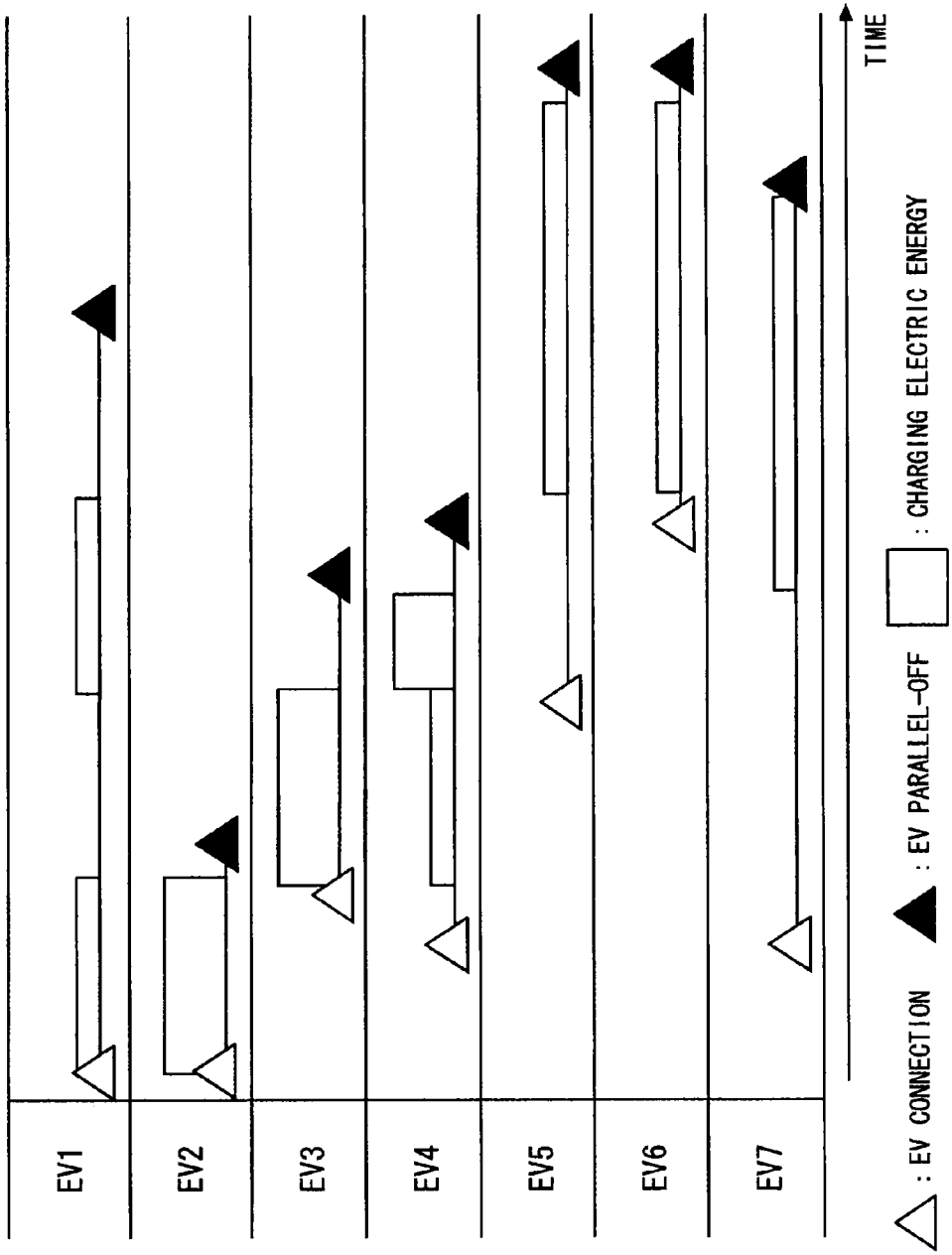
FIG. 4 is a diagram illustrating the charging plan prepared by using the charging instructions information, the connection-and-parallel-off state, and reservation information according to the first embodiment of the present invention.

FIG. 3 is a diagram illustrating an example of the charging plan prepared by only using the charging instructions information and the connection-and-parallel-off information, and FIG. 4 is a diagram illustrating an example of the charging plan prepared by using the reservation information in addition to the charging instructions information and the connection-and-parallel-off information. Herein, each vertical axis represents the charging electric energy of the individual EV, and each horizontal axis represents time. A white triangle represents EV connection start time, and a black triangle represents EV connection parallel-off time. In addition, the charging electric energy represents the quantity thereof per time in a vertical direction, and represents time to charge in a horizontal direction.

In addition, FIG. 5 is a diagram graphing the charging electric energy according to the plan of FIG. 3 and FIG. 4.

When only the charging instructions information and the connection-and-parallel-off information are used, as illustrated in FIG. 3, only the charging plan for charging of the EV connected at the time of plan preparation (for example, EV1, EV2 of which connection is established with the charging stand at current time) can be made.

Accordingly, an EV that needs short-time charging later (for example, EV3, EV4 which are short in the horizontal direction and require charging electric energy) cannot be grasped, and when the necessary charging quantity of the EV is to be satisfied within time, the electric energy will increase rapidly.

On the other hand, as illustrated in FIG. 4, since estimated connection of the EV can be grasped by using prior reservation information, even when an EV that needs short-time charging later (for example, EV3, EV4) exists, a charging plan that levels electric energy necessary for charging can be prepared.

As described above, when prior reservation information, that is, the reservation information about the EV before arriving at the charging stand is used to prepare the charging plan (graph of the solid line illustrated in FIG. 5), as compared with a case where the charging plan (graph of the dotted line illustrated in FIG. 5) is prepared only by using the charging instructions information and the connection-and-parallel-off information, the electric energy necessary for charging can be leveled more.

Figure 13:
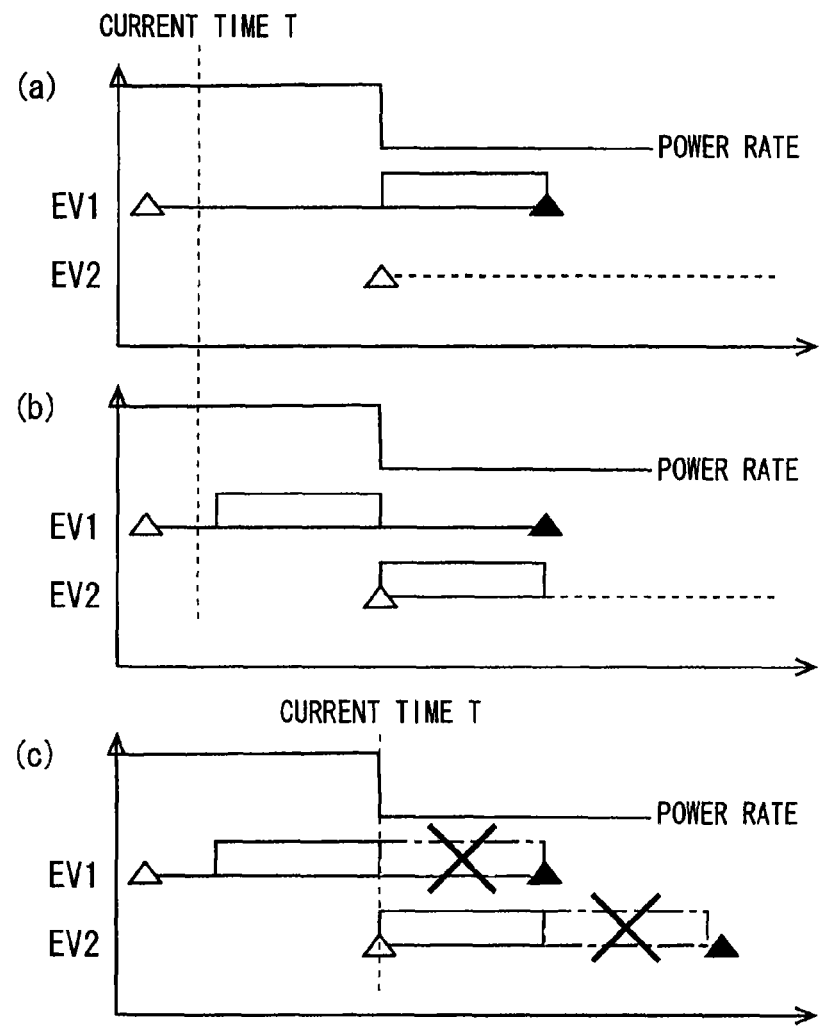
FIG. 13 is a diagram illustrating a charging plan with the reservation information not including estimated parallel-off time in the first embodiment of the present invention.

In addition, FIG. 13 is a diagram illustrating an example of the charging plan with the reservation information not including the estimated parallel-off time, and FIG. 14 is a diagram illustrating an example of the charging plan with the reservation information including the estimated parallel-off time. Herein, each vertical axis represents the charging electric energy and power rate of the EV, and each horizontal axis represents time. In FIG. 13 and FIG. 14, the power rate is set higher in the first half and lower in the second half.

As illustrated in FIG. 13, when the reservation information does not include the estimated parallel-off time, since the estimated parallel-off time is unknown until the EV2 is connected, it is necessary to make the charging plan to start charging the EV2 immediately after the connection.

Accordingly, when the power consumption has a constraint, the charging plan (part (a) of FIG. 13) for the EV1 already prepared is moved up in some cases (part (b) of FIG. 13), and a plan to charge the EV1 at a time period when the power rate is higher will be prepared. Even when it is found out that there is sufficient time for charging time after the EV2 is connected and the EV1 can be charged at a time period when the power rate is lower, since charging of the EV1 has already been completed in the stage where the EV2 is connected, a phenomenon in which the EV1 cannot be charged at a time period when the power rate is lower occurs (part (c) of FIG. 13).

On the other hand, in a case illustrated in FIG. 14, since the reservation information includes the estimated parallel-off time, it can be grasped at the time of receiving the reservation information that there is sufficient charging time for the EV2 and that the EV2 can be charged after the charging of the EV1 is completed. Accordingly, without changing the already prepared charging plan (part (a) of FIG. 14) for the EV1, the charging plan for the EV2 can be prepared (part (b) of FIG. 14) and both EV1 and EV2 can be charged at a time period when the power rate is lower (part (c) of FIG. 14).

Figure 15:
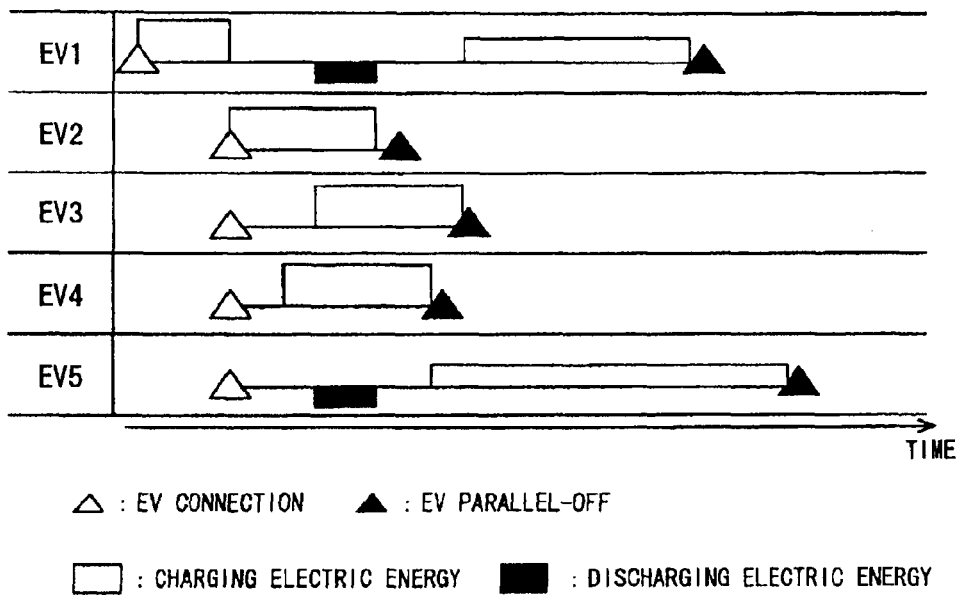
FIG. 15 is a diagram illustrating a charging plan prepared in consideration of the charging electric energy of a negative value in the first embodiment of the present invention.

In addition, FIG. 15 is a diagram illustrating an example of the charging plan for a case where P (k, i) or $S_{min}$ can be a negative value (electric discharge). Herein, a vertical axis represents the charging electric energy of each EV, and a horizontal axis represents time. In addition, FIG. 16 is a diagram graphing power consumption associated with charging of FIG. 15, and power consumption associated with charging for a case where P (k, i) or $S_{min}$ cannot be a negative value (electric discharge).

Figure 16:
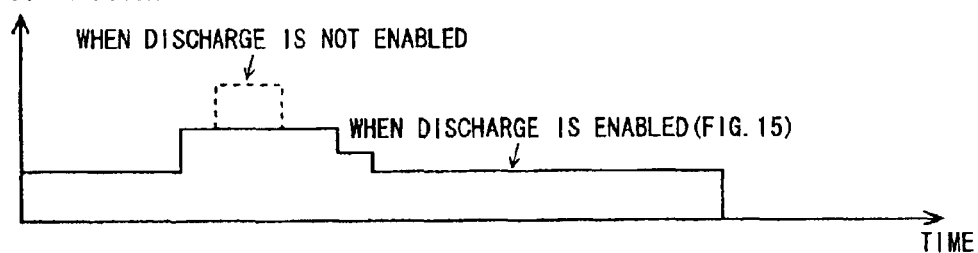
FIG. 16 is a graph of the electric energy for each time required in the charging plan of FIG. 15 according to the first embodiment of the present invention.

As illustrated in FIG. 15 and FIG. 16, when charging of a plurality of EVs is simultaneously required, by supplying electric power through electric discharge from another EV that has a charging margin, a short-time increase in the power consumption can be prevented, and stable electric power supply can be performed.

The charging plan prepared in the above-described example is for a case where connection and parallel-off of the EV are made in accordance with the reservation information. However, the reservation information includes uncertainty, and the connection-and-parallel-off state based on the reservation information and the connection-and-parallel-off state based on the connection-and-parallel-off information do not necessarily coincide.

Accordingly, the charging plan preparation unit 107 of the present invention can prepare a charging plan in consideration of the uncertainty factor that the reservation information has.

Figure 6:
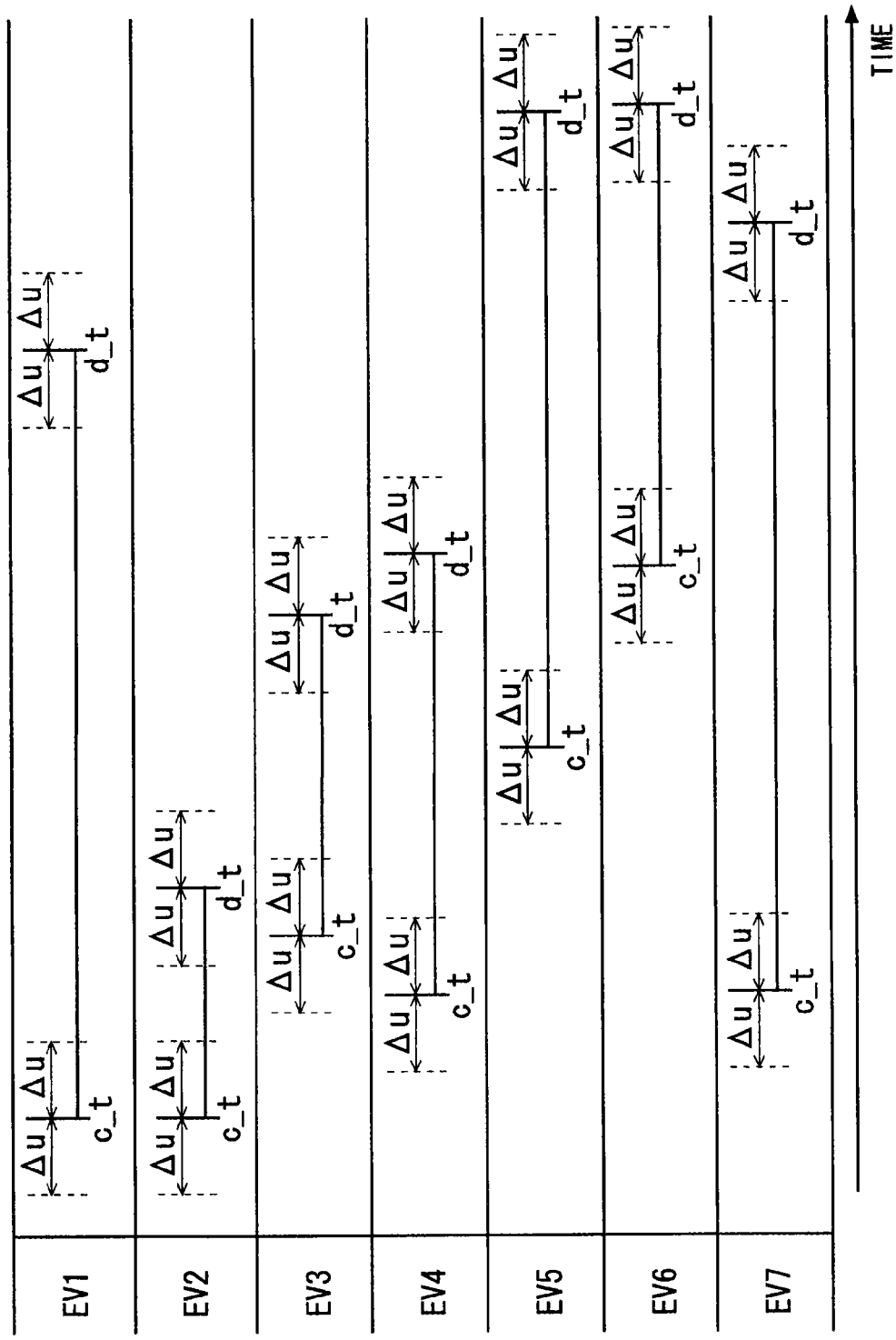
FIG. 6 is a diagram illustrating estimated connection-and-parallel-off time in consideration of uncertainty of the reservation information in the first embodiment of the present invention.

Specifically, as illustrated in FIG. 6, time (allowable estimated connection time and allowable estimated parallel-off time) that allows ±Δu to estimated connection time c_t and estimated parallel-off time d_t of each EV is considered. Then, a charging plan in consideration of the section is prepared. A vertical axis represents the individual EVs and a horizontal axis represents time.

Herein, in preparation of the charging plan, a charging plan group may be prepared by the Monte Carlo simulation based on the normal distribution in the section, and the most probable plan therefrom may be the charging plan. In addition, a plan prepared with the allowable estimated connection time c_t+Δu and allowable estimated parallel-off time d_t−Δu having maximum allowable time as the worst case may be the charging plan.

The aforementioned energy management system 101 can prepare the charging plan that meets the purpose of the consumer better than a charging plan prepared without using the reservation information by grasping future connection-and-parallel-off time of the EV and taking into consideration the uncertainty factor such as the reservation information. This allows prevention of power consumption at the time when the power rate is higher, and prevention of rapid increase in the electric power demand even when a plurality of EVs are connected to the charging stand at the same time.

<Effect>

According to the embodiment of the present invention, the energy management system includes the charging stand as an electric power supply part that supplies electric power to the electric vehicle (EV), the reservation information acquisition unit 106 that acquires the reservation information on the electric power reception of the EV in the charging stand before the EV arrives at the charging stand, the charging plan preparation unit 107 that predicts the electric power demand in the charging stand and prepares the charging plan for the EV based on the reservation information, and the charging controller 108 that controls the electric power supply to the EV in the charging stand based on the charging plan, and since the future electric power demand in consideration of the EV to be connected can be predicted, it is possible to achieve leveling of the electric power demand for charging of a plurality of EVs with different connection time to the charging stand.

In addition, since the future electric power demand in consideration of the EV to be connected can be predicted, it is possible to eliminate disadvantage such as the battery residual quantity necessary for the EV with lower priority being not secured because the priority and the like are set to give precedence to charging of a specified EV.

In addition, it is possible to avoid the time when the power rate is higher by leveling the electric power demand, and to minimize the electric power costs of a charging facility.

In addition, according to the embodiment of the present invention, in the energy management system, since the reservation information includes at least the estimated connection time of the EV to the charging stand as an electric power supply part and the estimated parallel-off time from the charging stand, it is possible to prepare the charging plan in consideration of the estimated connection time and estimated parallel-off time of the EV to be connected.

In addition, since the electric vehicle is charged as outside the scope of charging quantity control until the charging quantity of the electric vehicle reaches the minimum charging quantity to be secured by further including the minimum charging quantity to be secured in the reservation information, it is possible to prevent a situation where the EV has not been charged when sudden use of the EV occurs and to improve the convenience for the EV user.

In addition, according to the embodiment of the present invention, in the energy management system, by allowing designation of a negative value as the charging electric energy of the EV and performing discharge from the EV having a margin in the charging quantity at a time when the electric power demand and supply is tight and at a time when the power rate is higher, it is possible to suppress the power consumption and achieve minimization of the electric power costs and leveling of the electric power supply.

In addition, at this time, since loss caused by charging or discharging of the EV battery can be suppressed by controlling all the connected EVs with the charging electric energy of a positive value or the charging electric energy of a negative value, it is possible to achieve accurate charging of the EV, and it is further possible to achieve minimization of the electric power costs and leveling of the electric power supply.

In addition, according to the embodiment of the present invention, in the energy management system, the charging plan preparation unit 107 prepares a charging plan based on the allowable estimated connection time shifted from the estimated connection time by a predetermined time and the allowable estimated parallel-off time shifted from the estimated parallel-off time by the predetermined time, and even when the EV is connected at a time shifted from the estimated connection time and estimated parallel-off time in the reservation information, it is possible to prepare an effective charging plan.

Second Embodiment

Configuration

Figure 7:
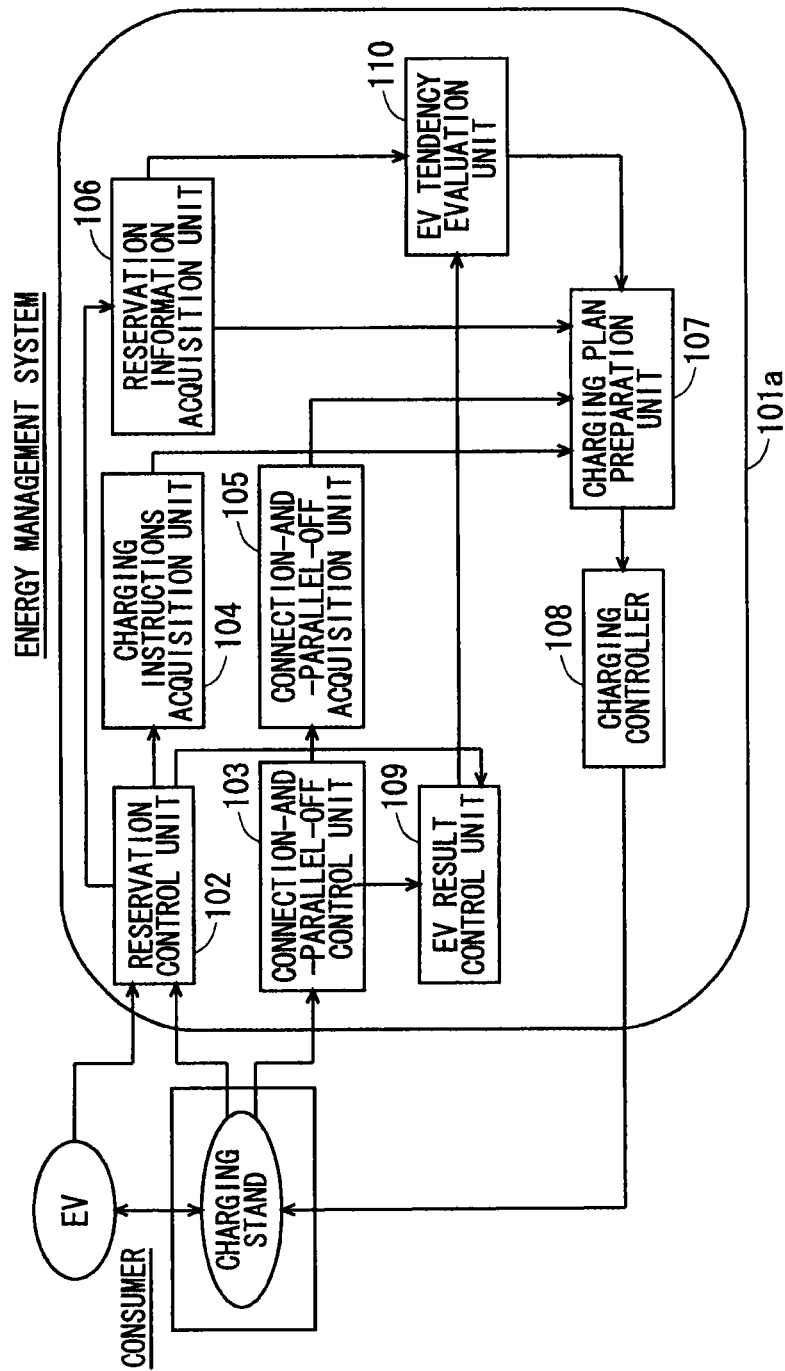
FIG. 7 is a configuration diagram of the energy management system according to a second embodiment of the present invention.

FIG. 7 is a configuration diagram of an energy management system according to a second embodiment of the present invention. Since an identical reference symbol assigned in FIG. 1 and FIG. 7 refers to an identical or equivalent configuration, description will be omitted.

An energy management system 101a in the present invention includes, in addition to components described in the first embodiment, an EV result control unit 109 that controls connection-and-parallel-off information and data accumulated in a reservation control unit 102, and an EV tendency evaluation unit 110 that evaluates a tendency of an EV from reservation information and the connection-and-parallel-off information.

However, the EV result control unit 109 may be an external function of the energy management system 101a of the present invention.

First, the EV result control unit 109 will be described. The EV result control unit 109 controls the data accumulated in the reservation control unit 102 (reservation information and charging instructions information) and the connection-and-parallel-off information controlled in a connection-and-parallel-off control unit 103, and associates and accumulates estimated connection-and-parallel-off time and connection-and-parallel-off time. Herein, in storage of the data, the data is stored in a form including EV identification ID, user identification 1D, date and time (day of the week), and the like of EV information in the connection-and-parallel-off information.

Next, the EV tendency evaluation unit 110 will be described. The EV tendency evaluation unit 110 prepares tendency information (EV tendency information) of the EV used at the time of preparation of a charging plan from the data accumulated in the EV result control unit 109.

Specifically, the EV tendency evaluation unit 110 calculates each of a time lag between estimated connection time and actual connection time (connection time−estimated connection time) of the EV and a time lag between estimated parallel-off time and actual parallel-off time (parallel-off time−estimated parallel-off time) accumulated in the EV result control unit 109 to prepare a histogram representing a frequency between certain time points. Herein, the histogram may be for each EV, but may be for each user, each date and time, each day-of-the-week, or in combination thereof.

Furthermore, the EV tendency evaluation unit 110 outputs the prepared EV tendency information to a charging plan preparation unit 107.

<Operation>

FIG. 8 is an example of the prepared histogram of the time lag. Part (a) of FIG. 8 is the histogram of the time lag prepared for each user, and part (b) of FIG. 8 is a diagram of an example of the histogram prepared by combining the user and the day of the week.

Since the tendency of each EV user can be grasped in part (a) of FIG. 8, an allowable section in consideration of the tendency of each user and a probability distribution in the section can be used at the time of preparation of the charging plan.

In addition, by considering in combination with the day of the week as illustrated in part (b) of FIG. 8, not only the tendency of each user but also the tendency of the user for each day of the week can be grasped.

Then, the charging plan preparation unit 107 prepares the charging plan in consideration of uncertainty using the prepared histogram. Herein, in preparation of the charging plan, the Monte Carlo simulation based on the probability distribution obtained from the histogram may be used to calculate a time difference of the most probable frequency, and a worst case (for example, in the case of part (a) of FIG. 8, estimated connection time+40 minutes, estimated parallel-off time−30 minutes) may be assumed.

The aforementioned energy management system 101a can suppress an error of the connection-and-parallel-off time and the actual connection-and-parallel-off time at the time of preparing the charging plan by preparing the tendency information of each EV based on the accumulated past estimated connection-and-parallel-off time and actual connection-and-parallel-off time of the EV, and preparing the charging plan using the EV tendency information.

<Effect>

In addition, according to the embodiment of the present invention, the energy management system further includes a connection-and-parallel-off acquisition unit 105 that acquires the connection-and-parallel-off information indicating a connection state and parallel-off state of the EV to a charging stand as an electric power supply part, and the EV tendency evaluation unit 110 that evaluates the tendency of the EV using at least one of a difference between the estimated connection time and the actual connection time indicated by the connection-and-parallel-off information, and a difference between the estimated parallel-off time and the actual parallel-off time indicated by the connection-and-parallel-off information, wherein the charging plan preparation unit 107 prepares the charging plan based on an evaluation result in the EV tendency evaluation unit 110, thereby it is possible to take the uncertainty of the reservation information into consideration and suppress the error of the connection-and-parallel-off time and the actual connection-and-parallel-off time at the time of preparing the charging plan.

Third Embodiment

Figure 9:
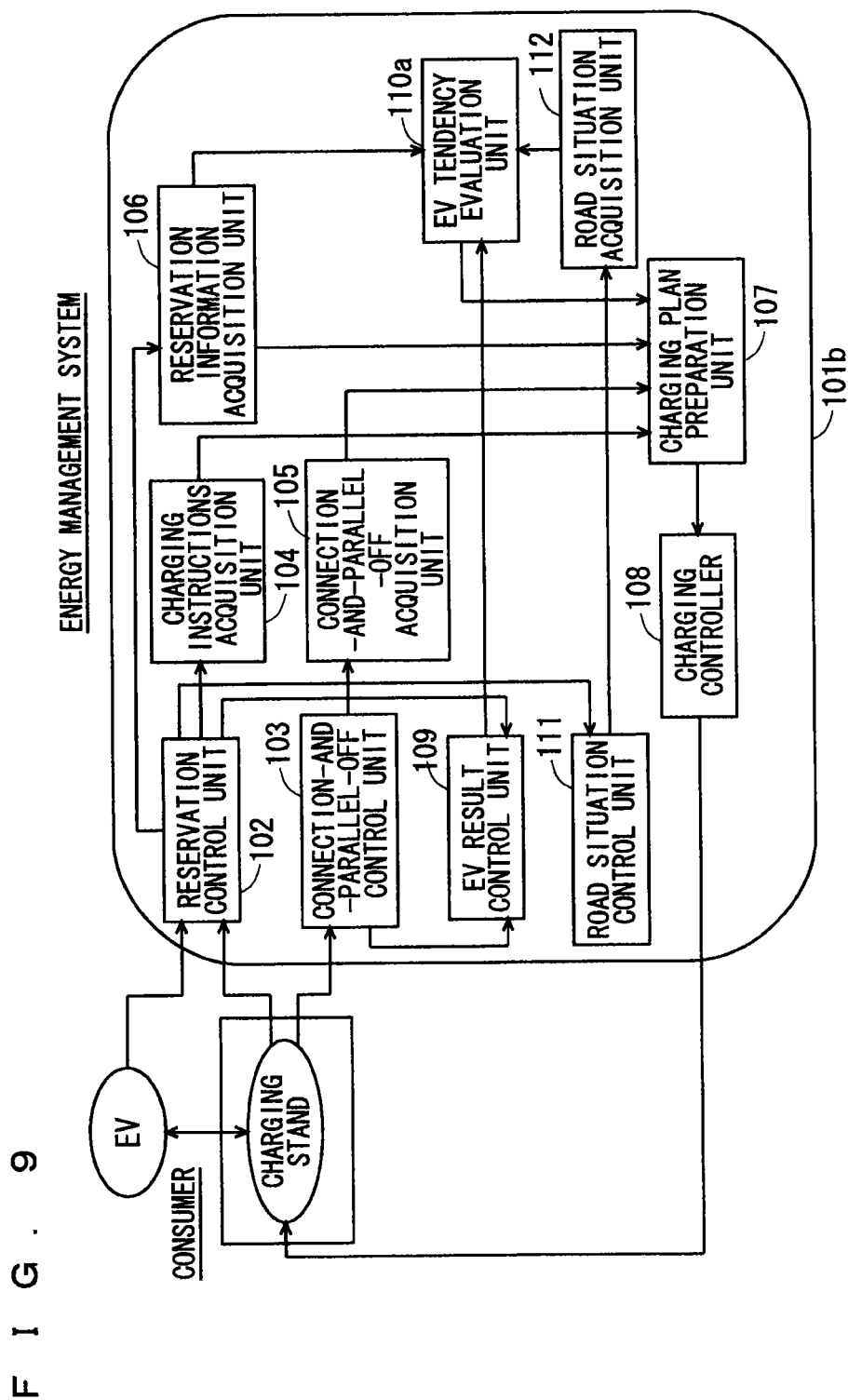
FIG. 9 is a configuration diagram of the energy management system according to a third embodiment of the present invention.

FIG. 9 is a configuration diagram of an energy management system according to a third embodiment of the present invention. Since an identical reference symbol assigned in FIG. 1, FIG. 7, and FIG. 9 refers to an identical or equivalent configuration, description will be omitted.

An energy management system 101b in the present invention includes, in addition to components described in the second embodiment, a road situation control unit 111 that controls a road situation of a current location of an EV, and a road situation acquisition unit 112 that acquires information (road situation information) regarding the road situation.

However, the road situation control unit 111 may be an external function of the energy management system 101b of the present invention. In addition, basic operation and the like of an EV tendency evaluation unit 110a are similar to those of the EV tendency evaluation unit 110 of the second embodiment with only connections being different.

First, the road situation control unit 111 will be described. The road situation control unit 111 receives reservation information of a charging stand obtained from a reservation control unit 102, and controls the road situation, such as a current location of the reserved EV and traffic congestion of a path from the current location to the charging stand as the road situation information.

Next, the road situation acquisition unit 112 will be described. The road situation acquisition unit 112 receives the road situation information of the EV stored in the road situation control unit 111. Then, the road situation acquisition unit 112 outputs the road situation information to the EV tendency evaluation unit 110a.

The EV tendency evaluation unit 110a receives the road situation information of the reserved EV from the road situation acquisition unit 112, predicts connection time of the EV, and corrects estimated connection time obtained from a reservation information acquisition unit 106. Specifically, when the traffic congestion occurs in the path to the charging stand, the EV tendency evaluation unit 110a performs the correction assuming that there is a tendency to be delayed from the estimated connection time by a predetermined time.

However, since the prediction of the connection time uses a method similar to a prediction method of estimated time of arrival of an existing car navigation system, the EV tendency evaluation unit 110a may receive the estimated connection time of the EV directly from the car navigation system mounted in the EV.

Then, the charging plan preparation unit 107 prepares the charging plan based on EV tendency information prepared in the EV tendency evaluation unit 110a.

The aforementioned energy management system 101b can suppress an error of the estimated connection time and the actual connection time at the time of preparing the charging plan by taking the current road situation into consideration in addition to the tendency information of each EV based on the accumulated past estimated connection-and-parallel-off time and actual connection-and-parallel-off time of the EV. Therefore, when traffic congestion occurs due to an accident or a weather change, it is possible to prepare a charging plan with higher precision than a charging plan prepared by using past EV result values or the like.

<Effect>

According to the embodiment of the present invention, the energy management system further includes the road situation acquisition unit 112 that acquires the road situation information indicating the road situation around the current location of the EV, wherein the charging plan preparation unit 107 prepares the charging plan based on the road situation information, thereby it is possible to prepare a higher-precision charging plan even when traffic congestion occurs due to an accident or a weather change.

Fourth Embodiment

Figure 10:
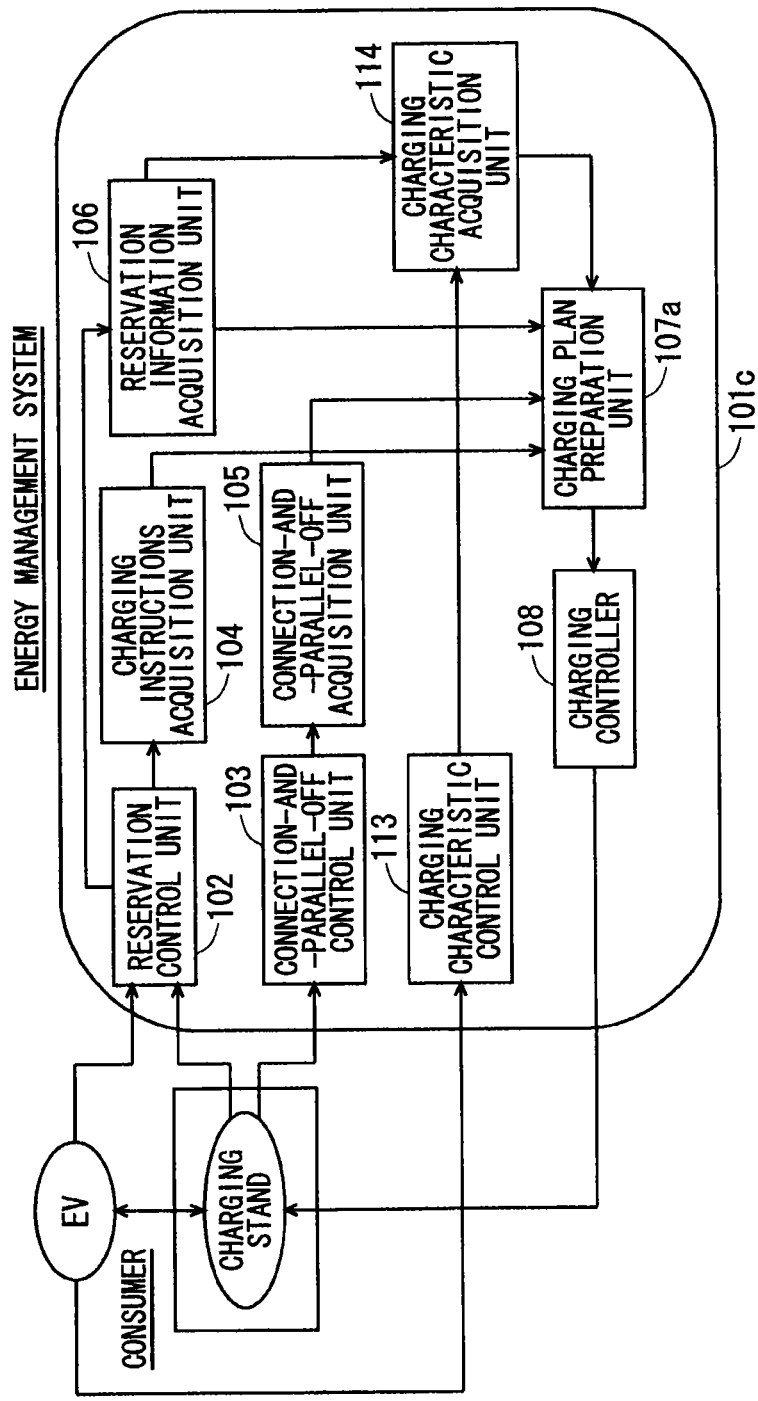
FIG. 10 is a configuration diagram of the energy management system according to a fourth embodiment of the present invention.

FIG. 10 is a configuration diagram of an energy management system according to a fourth embodiment of the present invention. Since an identical reference symbol assigned in FIG. 1 and FIG. 10 refers to an identical or equivalent configuration, description will be omitted.

An energy management system 101c in the present invention includes, in addition to components described in the first embodiment, a charging characteristic control unit 113 that controls a charging characteristic of each EV, and a charging characteristic acquisition unit 114 that acquires information (charging characteristic information) regarding the charging characteristic of a battery of each EV from the charging characteristic control unit 113.

However, the charging characteristic control unit 113 may be an external function of the energy management system 101c of the present invention.

First, the charging characteristic control unit 113 will be described. A battery capacity of the EV decreases as charging is repeated. In addition, charging efficiency (loss) of the battery differs depending on electric energy supplied from a charging stand. Accordingly, the charging characteristic control unit 113 controls the battery capacity (chargeable capacity) of the battery of each EV and the charging characteristic, such as the charging efficiency, as the charging characteristic information. The charging characteristic information is acquired from each EV.

Next, the charging characteristic acquisition unit 114 will be described. The charging characteristic acquisition unit 114 acquires the charging characteristic information about the battery of each EV accumulated in the charging characteristic control unit 113. Then, a charging plan preparation unit 107a prepares the charging plan that takes into consideration the charging characteristic of the battery of the EV obtained by the charging characteristic acquisition unit 114 in addition to reservation information, charging instructions information, and connection-and-parallel-off information of the first embodiment.

Specifically, when the charging plan that minimizes electric power costs in consideration of the charging efficiency is prepared, the charging plan is prepared by setting the charging loss of each EV with respect to electric energy supplied from the charging stand to 1 (k, i), changing Equation (1) of the first embodiment to Equation (5), and solving an optimization problem.

[Equation 5]

$$P(k) = \sum_{i=1}^{n} P(k, i) + l(k, i) \quad (5)$$

The aforementioned energy management system 101c can prepare the charging plan that suppresses the loss associated with charging of the EV by preparing the charging plan using the battery charging characteristic of the EV.

<Effect>

According to the embodiment of the present invention, the energy management system further includes the charging characteristic acquisition unit 114 that acquires the chargeable capacity of the EV and the charging characteristic information regarding the charging efficiency of the EV, wherein the charging plan preparation unit 107 prepares the charging plan based on the charging characteristic information, thereby it is possible to suppress power consumption due to the charging loss of the battery and prepare the charging plan more suitable for the EV.

Fifth Embodiment

Figure 11:
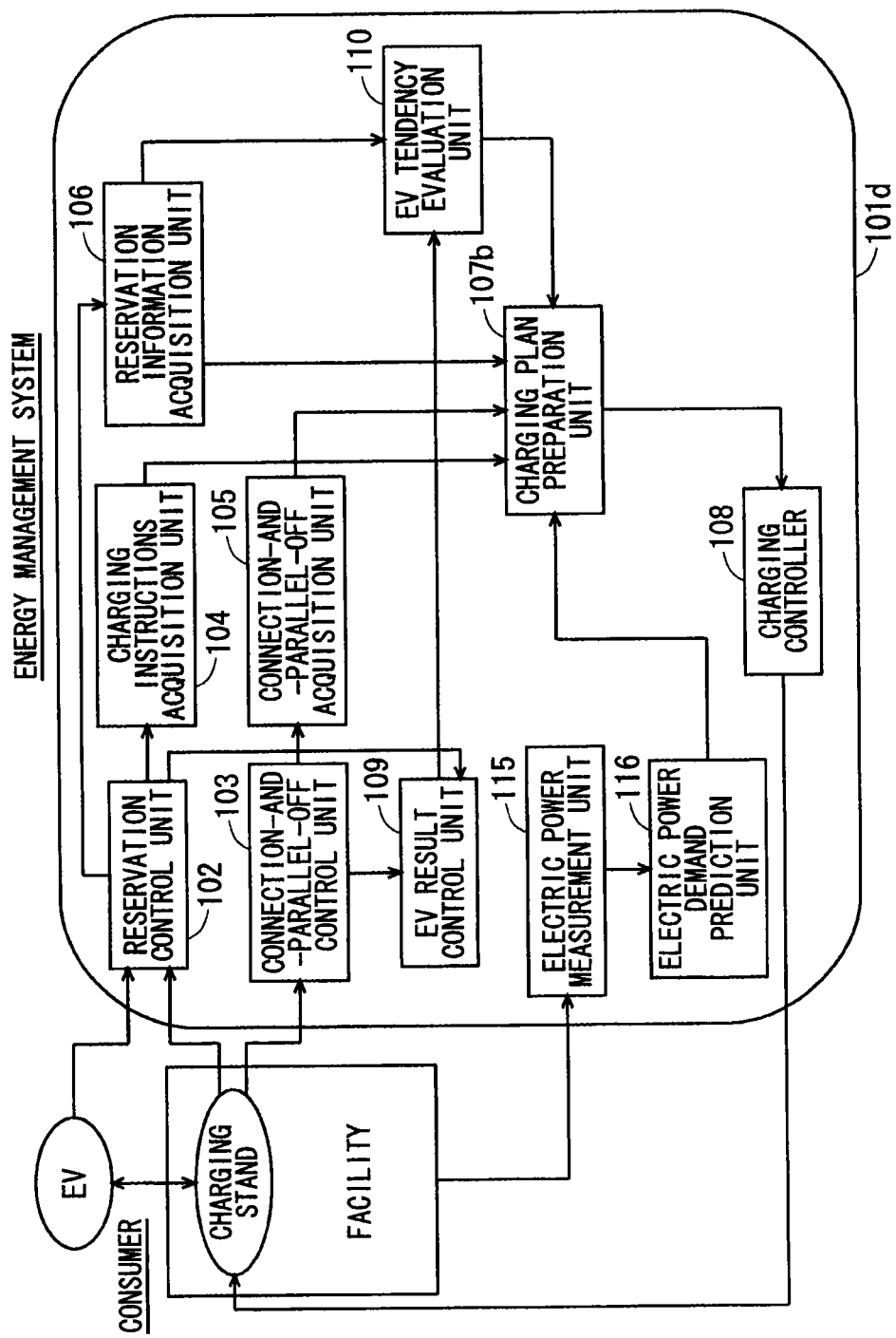
FIG. 11 is a configuration diagram of the energy management system according to a fifth embodiment of the present invention.

FIG. 11 is a configuration diagram of an energy management system according to a fifth embodiment of the present invention. Since an identical reference symbol assigned in FIG. 1, FIG. 7, and FIG. 11 refers to an identical or equivalent configuration, description will be omitted.

An energy management system 101d in the present invention includes, in addition to components described in the second embodiment, an electric power measurement unit 115 that measures power consumption of a facility which a consumer has, and an electric power demand prediction unit 116 that predicts an electric power demand.

However, the electric power measurement unit 115 and the electric power demand prediction unit 116 may be external functions of the energy management system 101d of the present invention. In addition, basic operation and the like of a charging plan preparation unit 107b are similar to those of the charging plan preparation unit 107 in the second embodiment with only connections being different.

First, the electric power measurement unit 115 will be described. The electric power measurement unit 115 measures the power consumption of the facility having a charging stand with a period of Δt and stores data.

Next, the electric power demand prediction unit 116 will be described. The electric power demand prediction unit 116 predicts the future electric power demand based on the past power consumption of the facility stored in the electric power measurement unit 115.

Specifically, a histogram of the power consumption during a period Δs from x hours before to current time t is prepared. Then, similarity to a histogram of the power consumption until past identical time in the facility is calculated, and the data with the similarity being equal to or greater than a threshold th is acquired. The electric power demand from the current time t to the next time t+Δt is predicted for each period Δs from the acquired data.

Herein, the calculation of the similarity may be a residual sum of squares or a correlation coefficient. In addition, as a predicted value of the electric power demand, data with the highest similarity may be used, or an average value of data having certain similarity or greater may be used.

Then, in addition to EV tendency information prepared in an EV tendency evaluation unit 110, the charging plan preparation unit 107b prepares the charging plan that takes into consideration the electric power demand of the facility until the next time t+Δt predicted in the electric power demand prediction unit 116.

Specifically, when the charging plan that minimizes electric power costs in consideration of the electric power demand of the facility is prepared, the charging plan is prepared by setting the predicted electric power demand for each period Δs as F (i), changing Equation (2) to Equation (6), and solving an optimization problem.

[Equation 6]

$$\min \sum_{i=t}^{t+\Delta t} \{m(i) \times (P(i) + F(i))\} \quad (6)$$

The aforementioned energy management system 101d can draft the charging plan in consideration of the electric power demand of the overall facility that has the charging stand by predicting the electric power demand of the facility. This allows minimization of the electric power costs and leveling of the electric power demand of the overall facility that has the charging stand.

<Effect>

According to the embodiment of the present invention, in the energy management system, the charging plan preparation unit 107 predicts the electric power demand of the overall facility that has the charging stand as an electric power supply part and prepares the charging plan, thereby it is possible to draft the charging plan in consideration of the electric power demand of the overall facility that has the charging stand.

Sixth Embodiment

Figure 12:
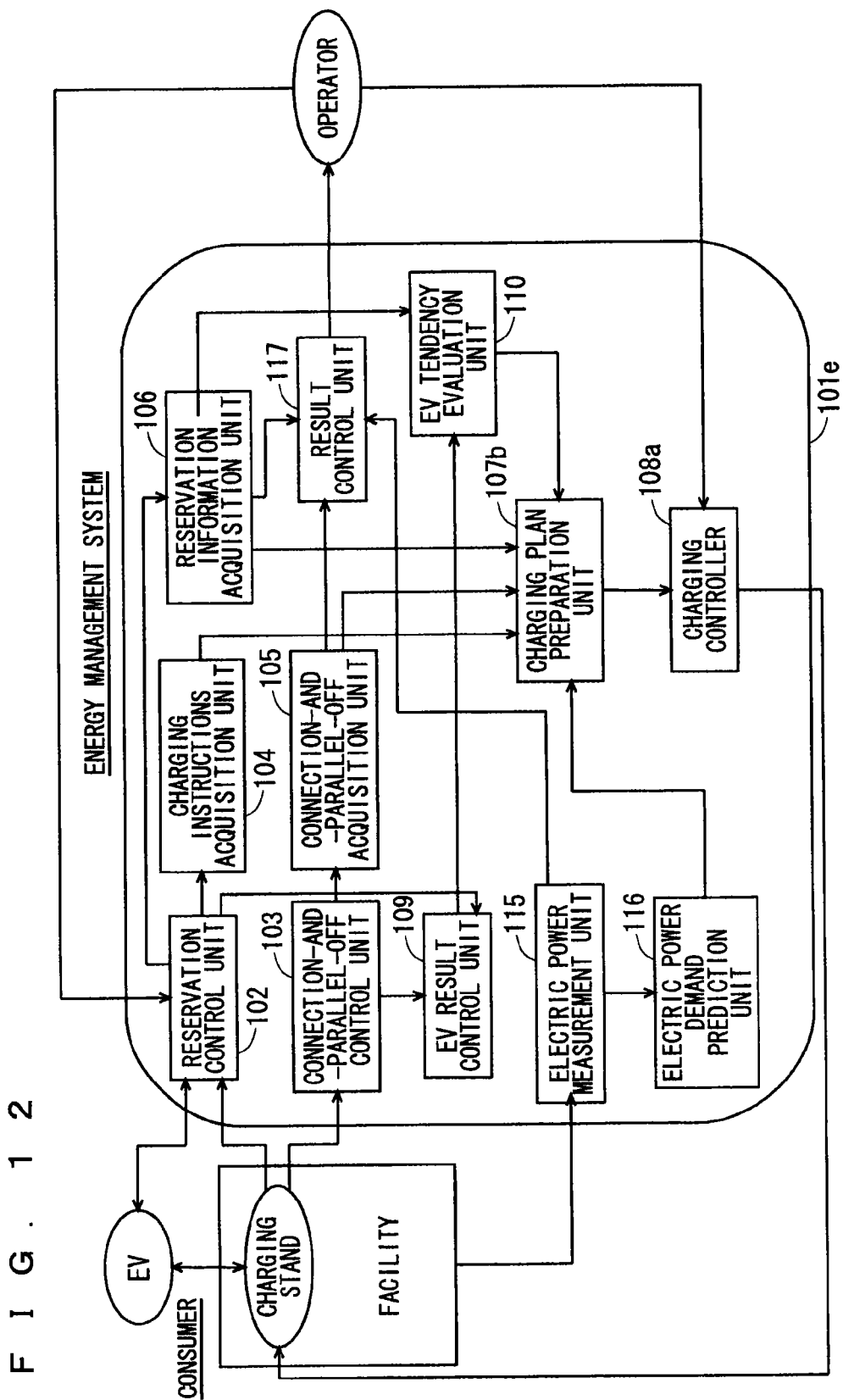
FIG. 12 is a configuration diagram of the energy management system according to a sixth embodiment of the present invention.

FIG. 12 is a configuration diagram of an energy management system according to a sixth embodiment of the present invention. Since an identical reference symbol assigned in FIG. 1, FIG. 7, FIG. 11, and FIG. 12 refers to an identical or equivalent configuration, description will be omitted.

An energy management system 101e in the present invention includes, in addition to components described in the fifth embodiment, a result control unit 117 that displays a current situation to an operator of the energy management system 101e. In addition, basic operation and the like of a charging controller 108a are similar to those of the charging controller 108 in the fifth embodiment with only connections being different.

First, the result control unit 117 will be described. The result control unit 117 acquires data stored in a connection-and-parallel-off acquisition unit 105, a reservation information acquisition unit 106, and an electric power measurement unit 115, and controls the data so that the operator of the energy management system 101e can check past power consumption, connection-and-parallel-off time of an EV, reservation information, and the like.

In addition, based on information checked via the result control unit 117, the operator can make a cooperation request for a reservation change to a user of the EV reserved by a reservation control unit 102 so as to advance or delay connection time and parallel-off time.

Herein, the cooperation request may be made directly by the operator to the user of the EV, or a system that the operator side configures to what extent the request is to be followed and that makes the cooperation request automatically to the user of the EV may be used.

However, when the user does not have an advantage by accepting the cooperation request, the user is considered to decline the request. Accordingly, a reward point is given to a user who accepts the request. The reward point may be a point such as an eco-point, but may not necessarily be money or an equivalent of money.

Next, the charging controller 108a will be described. The charging controller 108a allows the operator to directly perform charging control depending on a situation in addition to performing charging control over the EV based on a charging plan prepared in a charging plan preparation unit 107.

The aforementioned energy management system 101e can adjust the power consumption because the operator can directly perform the charging control or make a request for the reservation change to the user of the EV even when the prepared charging plan differs from the actual situation.

Therefore, even when a difference between the power consumption according to the prepared charging plan and the actual power consumption becomes larger, it is possible to adjust the power consumption, minimize the electric power costs, level the electric power demand, and respond to the reduction request of the power consumption flexibly.

<Effect>

According to the embodiment of the present invention, the energy management system further includes the result control unit 117 that controls at least the reservation information, connection-and-parallel-off information, and the electric power demand of an overall facility, and since the charging plan preparation unit 107 changes the charging plan in response to the request from the result control unit 117 and enables adjustment of the power consumption, it is possible to prepare the charging plan that achieves minimization of the electric power costs and leveling of the electric power demand.

In addition, since adjustment of the power consumption becomes possible by the result control unit 117 performing charging control and making a request for the reservation change to the user of the EV, it is possible to achieve not only minimization of the electric power costs and leveling of the electric power demand but also a flexible response to the reduction request of the power consumption from a municipality.

Seventh Embodiment

Figure 17:
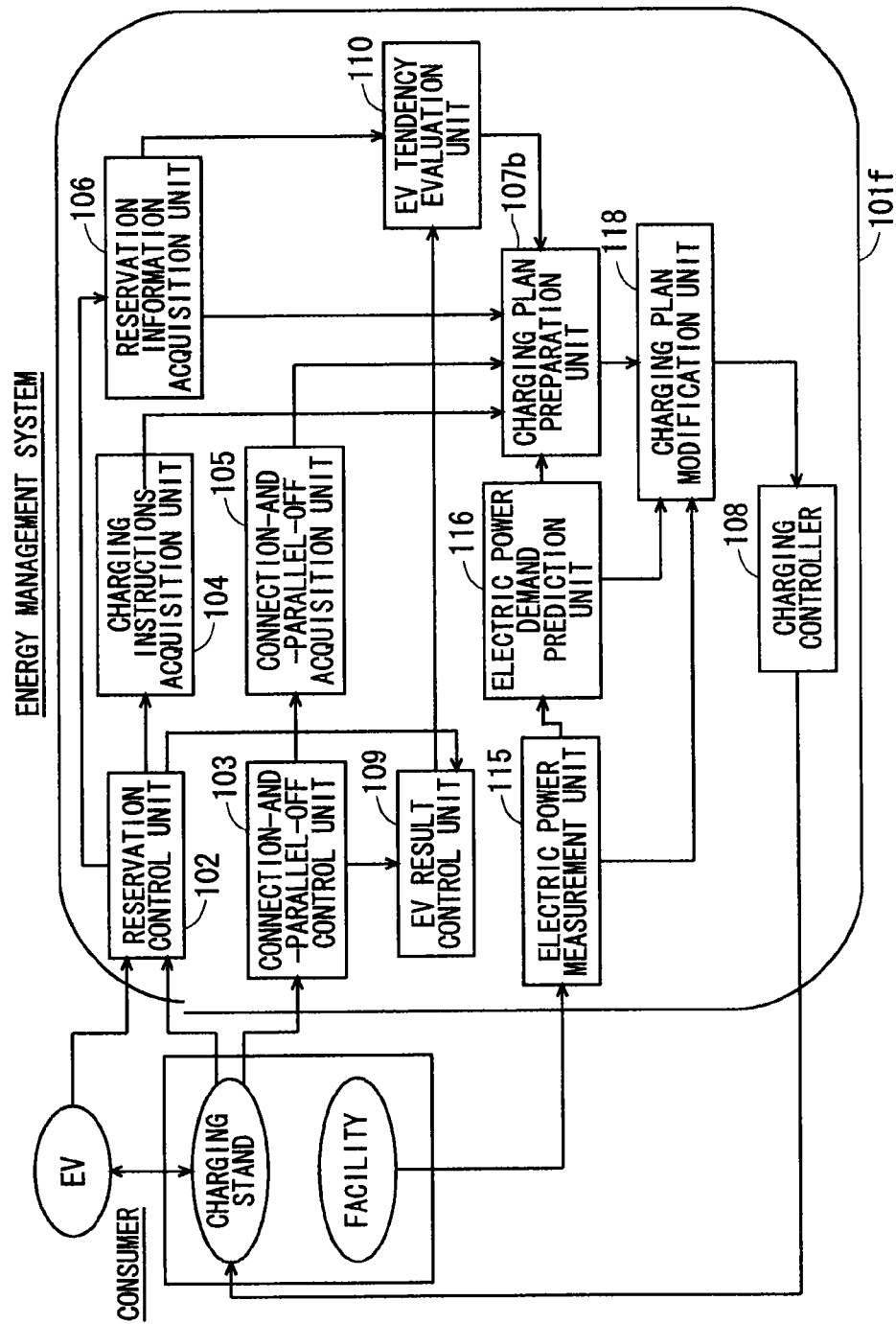
FIG. 17 is a configuration diagram of the energy management system according to a seventh embodiment of the present invention.

FIG. 17 is a configuration diagram of an energy management system according to a seventh embodiment of the present invention. Since an identical reference symbol assigned in FIG. 1, FIG. 7, FIG. 11, and FIG. 17 refers to an identical or equivalent configuration, description will be omitted.

An energy management system 101f in the present invention includes, in addition to components described in the fifth embodiment, a charging plan modification unit 118 that modifies a charging plan prepared from power consumption of an overall facility obtained from an electric power measurement unit 115 and a predicted value of an electric power demand obtained from an electric power demand prediction unit 116.

The charging plan modification unit 118 will be described. The charging plan modification unit 118 modifies the charging plan while comparing a result value of the power consumption of the overall facility with the predicted value of the electric power demand during a period $\Delta s$ (from time $t+\Delta s \times (i-1)$ to time $t+\Delta s \times i$).

Figure 18:
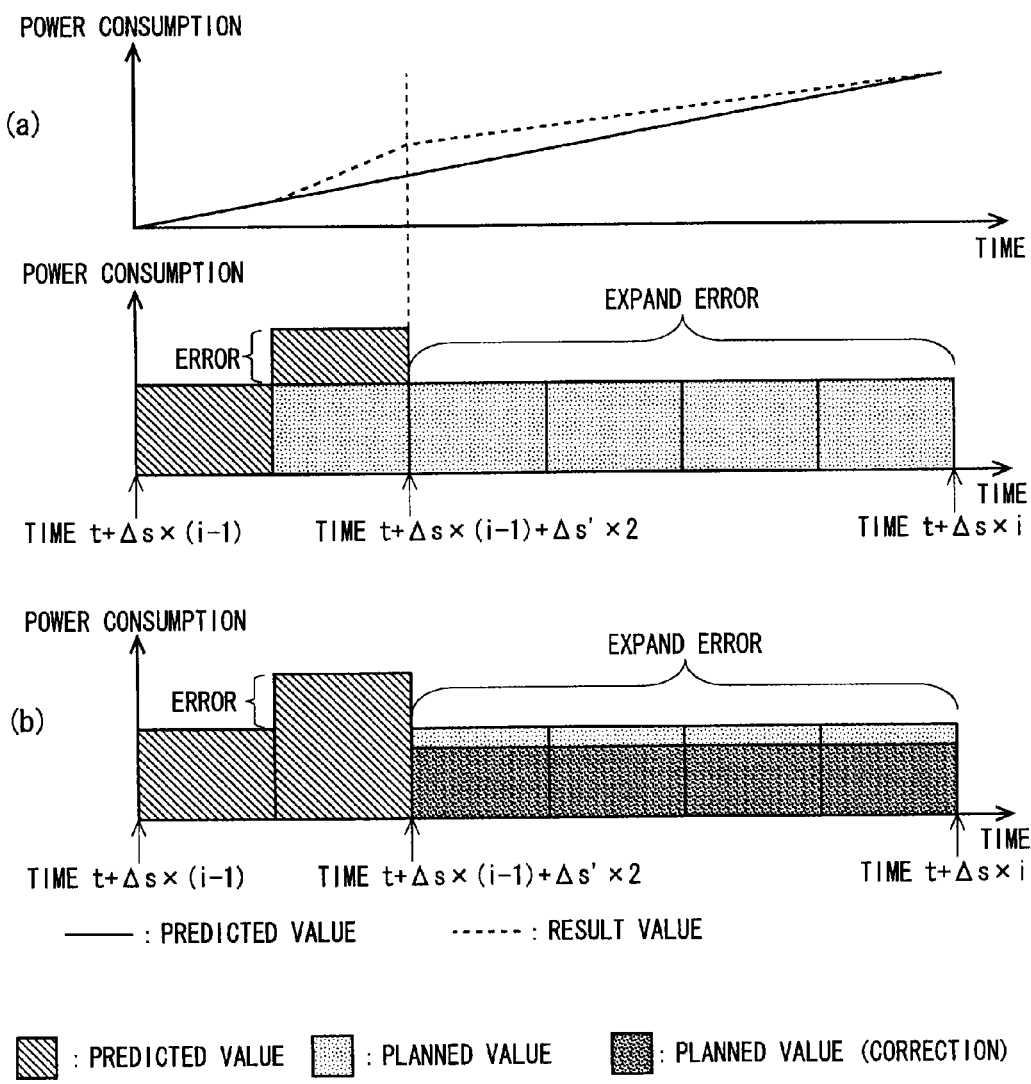
FIG. 18 is a diagram illustrating a correction method of an electric power demand in a charging plan modification unit of the seventh embodiment of the present invention.

FIG. 18 is an example of correction of the predicted value of the electric power demand based on the power consumption. Herein, a vertical axis represents the power consumption of the overall facility, and a horizontal axis represents time.

First, the period $\Delta s$ is further divided into a period $\Delta s'$ (period $\Delta s$>period $\Delta s'$), and the result value of the power consumption for each period $\Delta s'$ is acquired from the electric power measurement unit 115.

Next, an error of the result value with the predicted value of the electric power demand divided into the period $\Delta s'$ is calculated. Then, the calculated error is allocated to the predicted value of the electric power demand of residual time to correct the predicted value. However, a method of allocating the predicted value may be equal allocation by the residual time (FIG. 18), or the allocation may be made so that the allocated quantity decreases as time elapses.

Finally, the charging plan for the EV is modified based on the predicted value of the corrected electric power demand.

According to the aforementioned energy management system 101f, even when the predicted value of the electric power demand differs from the result value of the power consumption, since the power consumption during the period $\Delta s$ can be adjusted by calculating the error with the result value at fine periods and modifying the charging plan, it is possible to achieve minimization of electric power costs of the overall facility and leveling of the electric power demand accurately.

<Effect>

According to the embodiment of the present invention, the energy management system further includes the charging plan modification unit 118 that modifies the charging plan prepared from the power consumption of the overall facility obtained from the electric power measurement unit 115 and the predicted value of the electric power demand obtained from the electric power demand prediction unit 116, and since the charging plan modification unit 118 can adjust the power consumption by correcting the predicted value from the difference of the predicted value of the electric power demand and the actual power consumption and modifying the charging plan, it is possible to achieve minimization of the electric power costs of the overall facility and leveling of the electric power demand accurately.

Eighth Embodiment

Figure 19:
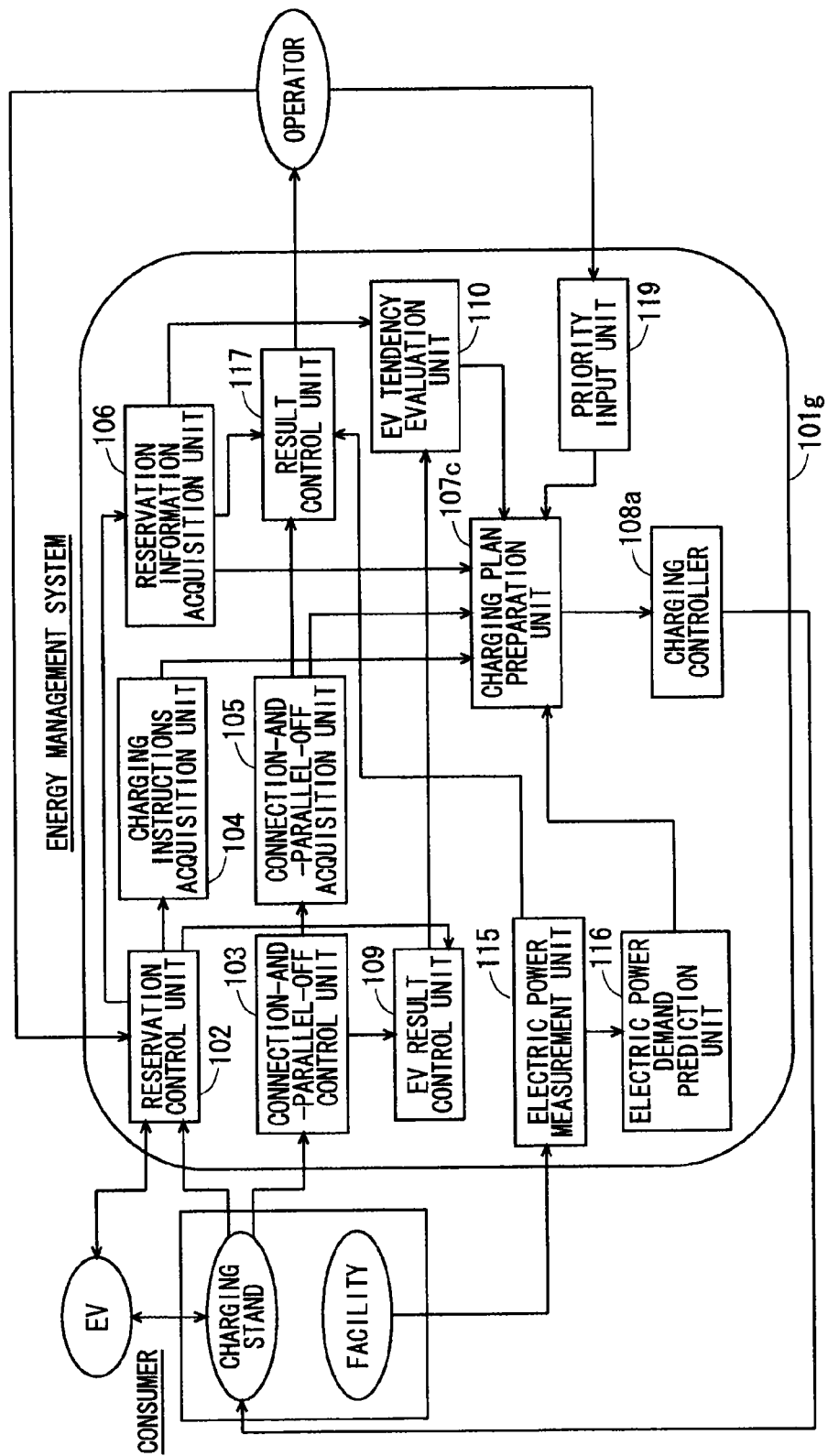
FIG. 19 is a configuration diagram of the energy management system according to an eighth embodiment of the present invention.

FIG. 19 is a configuration diagram of an energy management system according to an eighth embodiment of the present invention. Since an identical reference symbol assigned in FIG. 1, FIG. 7, FIG. 11, FIG. 12, and FIG. 19 refers to an identical or equivalent configuration, description will be omitted.

An energy management system 101g in the present invention includes, in addition to components described in the fifth embodiment, a priority input unit 119 that inputs whether precedence is given to charging of an EV or precedence is given to reduction (leveling and peak cut) of power consumption of an overall facility when a charging plan preparation unit 107c prepares a charging plan. However, the priority input unit 119 may be an external function of the energy management system 101g of the present invention.

The priority input unit 119 will be described. The priority input unit 119 has an input screen for specifying priority by an operator, and allows the operator to specify whether to prepare the charging plan by giving precedence to charging of the EV, or to prepare the charging plan by giving precedence to reduction (leveling and peak cut) of the power consumption of the overall facility. Then, the priority input unit 119 passes information regarding the priority specified by the operator to the charging plan preparation unit 107c. Herein, a setting method of the priority may be setting identical priority to entire time, or may allow setting for each period $\Delta s$.

Furthermore, the charging plan preparation unit 107c prepares the charging plan for the EV based on the set priority.

According to the aforementioned energy management system 101g, since the priority at the time of charging plan preparation can be set, preparation of the charging plan in response to a reduction request of the power consumption and preparation of the charging plan that allows reaching necessary charging quantity securely by the time the EV is paralleled off become possible, and it is possible to achieve charging control in accordance with a purpose of use for each facility.

<Effect>

According to the embodiment of the present invention, the energy management system further includes the priority input unit that inputs whether precedence is given to charging of the EV or precedence is given to reduction (leveling and peak cut) of the power consumption of the overall facility when the charging plan is prepared, wherein the charging plan preparation unit 107c prepares the charging plan for the EV based on the priority, thereby preparation of the charging plan in response to the elimination request of the power consumption and preparation of the charging plan that allows reaching the necessary charging quantity securely by the time the EV is paralleled off become possible, and it is possible to achieve charging control in accordance with a purpose of use for each facility.

Note that, in the present invention, a free combination of each embodiment, or modification of any component of each embodiment, or omission of any component in each embodiment can be made within the scope of the invention.

The present invention has been described in detail, but the above-mentioned description is in all aspects illustrative, and the present invention is not limited thereto. It is understood that countless variations that are not illustrated can be considered without departing from the scope of the present invention.

REFERENCE SIGNS LIST

101, 101a, 101b, 101c, 101d, 101e, 101f, 101g energy management system, 102 reservation control unit, 103 connection-and-parallel-off control unit, 104 charging instructions acquisition unit, 105 connection-and-parallel-off acquisition unit, 106 reservation information acquisition unit, 107, 107a, 107b, and 107c charging plan preparation unit, 108, 108a charging controller, 109 EV result control unit, 110, 110a EV tendency evaluation unit, 111 road situation control unit, 112 road situation acquisition unit, 113 charging characteristic control unit, 114 charging characteristic acquisition unit, 115 electric power measurement unit, 116 electric power demand prediction unit, 117 result control unit, 118 charging plan modification unit, 119 priority input unit.

The invention claimed is:

1. An energy management system comprising:
   an electric power supply part that supplies electric power to an electric vehicle;
   a reservation information acquisition unit that acquires reservation information before said electric vehicle arrives at the electric power supply part, said reservation information including at least estimated connection time that said electric vehicle is connected to said electric power supply part and estimated parallel-off time that said electric vehicle is paralleled off from said electric power supply part;
   a connection-and-parallel-off control unit that controls connection-and-parallel-off information indicating a connection state and parallel-off state of said electric vehicle to said electric power supply part;
   an electric vehicle result control unit that controls said reservation information and said connection-and-parallel-off information;
   an electric vehicle tendency evaluation unit that prepares tendency information of said electric vehicle using a difference between said estimated connection time and actual connection time indicated by said connection-and-parallel-off information, and a difference between said estimated parallel-off time and actual parallel-off time indicated by said connection-and-parallel-off information;
   a charging plan preparation unit that predicts an electric power demand in said electric power supply part and prepares a charging plan for said electric vehicle based on said tendency information; and
   a charging controller that controls electric power supply for said electric vehicle in said electric power supply part based on said charging plan.

2. The energy management system according to claim 1, wherein said electric vehicle result control unit controls said reservation information and said connection-and-parallel-off information in association with identification ID of said electric vehicle or user ID of said electric vehicle.

3. The energy management system according to claim 2, wherein said tendency information is probability distribution information of each said identification ID of said electric vehicle based on said difference of time.

4. The energy management system according to claim 2, wherein said tendency information is probability distribution information of each said user ID of said electric vehicle based on said difference of time.

5. The energy management system according to claim 1, wherein said tendency information is classified into at least either each day-of-the-week or a time period.

6. The energy management system according to claim 1, wherein said reservation information further includes a minimum charging quantity to be secured of said electric vehicle, and
   said charging plan preparation unit prepares said charging plan so that said electric vehicle is charged as outside a scope of control until a charging quantity of said electric vehicle reaches said minimum charging quantity to be secured.

7. The energy management system according to claim 1, wherein said charging plan preparation unit prepares said charging plan so that all electric vehicles connected to said electric power supply part are controlled to one of positive charging electric energy and negative charging electric energy.

8. An energy management system comprising:
   an electric power supply part that supplies electric power to an electric vehicle;
   a reservation information acquisition unit that acquires reservation information before said electric vehicle arrives at the electric power supply part, said reservation information including at least estimated connection time that said electric vehicle is connected to said electric power supply part and estimated parallel-off time that said electric vehicle is paralleled off from said electric power supply part;
   a charging plan preparation unit that predicts an electric power demand in said electric power supply part and prepares a charging plan for said electric vehicle based on allowable estimated connection time shifted from said estimated connection time by a predetermined time and allowable estimated parallel-off time shifted from said estimated parallel-off time by a predetermined time; and
   a charging controller that controls electric power supply for said electric vehicle in said electric power supply part based on said charging plan.

9. The energy management system according to claim 8, wherein said allowable estimated connection time is time estimated by a car-navigation system of said electric vehicle.

* * * * *